United States Patent Office 3,296,221
Patented Jan. 3, 1967

3,296,221
MERCAPTO-SUBSTITUTED THIO-PHOSPHITES AND PHOSPHATES AND POLYSULFIDE POLYMERS THEREOF
James W. Stanley, Jr., Phillips, Tex., assignor to Phillips Petroleum Company, a corporation of Delaware
No Drawing. Filed May 13, 1963, Ser. No. 280,074
11 Claims. (Cl. 260—79)

This invention relates to the preparation of organic compounds containing phosphorus and sulfur. In another aspect, it relates to mercapto-substituted thio-phosphites and phosphates and their preparation. In another aspect it relates to polysulfide polymers of such phosphites and phosphates and to the preparation of such polymers.

Organic compounds containing phosphorous and sulfur are of considerable industrial importance and processes for preparing them are of considerable interest. Accordingly, I have discovered a novel class of such compounds, viz., mercapto-substituted thiophosphites and phosphates, and processes for preparing the same. Briefly stated, such phosphites are prepared by this invention by reacting a dimercaptan with phosphorus trichloride and recovering said phosphite from the resulting reaction mixture. Such phosphites can be oxidized to obtain the corresponding phosphates. In another aspect of this invention, I have discovered that high molecular weight polysulfide polymers can be obtained by reacting the mercapto-substituted thio-phosphites and phosphates with dimercaptans in the presence of sulfur.

The dimercaptan which can be used to prepare the mercapto-substituted thio-phosphites and phosphates of this invention, and the corresponding polysulfide polymers thereof, can be represented by the general formula HS—R—SH, where R is an organo radical having 1 to 20 carbon atoms per molecule. R is preferably a radical selected from the group consisting of aliphatic, cycloaliphatic, and aromatic radicals, and combinations thereof, such as alkylaryl, alkylcycloalkyl, alkenylalkyl, arylalkyl, arylalkenyl, alkenylcycloalkyl, arylcycloalkyl, cycloalkylalkyl, cycloalkylalkenyl, cycloalkylaryl, arylcycloalkylalkyl, alkylcycloalkylaryl, etc. R can also be a heterocyclic radical such as

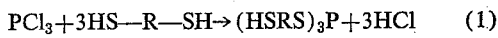

as well as other organic radicals.

Representative examples of suitable dimercaptan compounds that can be employed according to the invention include dimercapto ethane,
dimercapto propane,
1,5-dimercapto pentane,
1,6-dimercapto hexane,
1,8-dimercapto decane,
2,3-dimercapto pentadecane,
1,6-dimercapto eicosane,
1,4-dimercapto-2-butene,
1,8-dimercapto-2-octene,
dimercapto ethyl ether,
dimercapto propyl ether,
dimercapto dipropyl sulfide,
dimercapto xylene,
dimercapto diethoxy benzene,
1,3-dimercapto toluene,
p-dimercapto benzene,
dimercapto cyclohexane,
dimercapto methylcyclohexane,
2,9-p-methane dithiol,
dimercapto alphaterpinene,
dimercapto phellandrene,
dimercapto sylvestrene,
2,5-dimercapto pyridine,
dimercapto thiophene,
dimercapto p-dioxane, and the like.

The reaction of phosphorus trichloride with the dimercaptan to prepare the mercapto-substituted thio-phosphites of this invention can be illustrated by the following equation:

$$PCl_3 + 3HS—R—SH \rightarrow (HSRS)_3P + 3HCl \quad (1)$$

As shown in Equation 1, three moles of the dimercaptan are required to react stoichiometrically with the phosphorus trichloride and produce a mercapto-substituted thio-phosphite having three free mercapto groups. I prefer to use an excess of the dimercaptan, e.g., as much as twelve moles of dimercaptan per mole of the phosphorus trichloride, and preferably about six moles of the dimercaptan per mole of the phosphorus trichloride, to minimize or prevent some partially reacted material such as $(SHRS)_2PCl$ or $(HSRSP)Cl_2$ from reacting with itself or the $PCl_3$ from reacting with $(SHRS)_3P$. Accordingly, I prefer to add the phosphorus trichloride to the dimercaptan. The preparation of the mercapto-substituted thio-phosphites are preferably carried out in glass reaction vessels and equipment, though carbon steel equipment can be employed if a dry system is maintained, since the dry hydrogen chloride which is evolved is not corrosive. The reaction proceeds very rapidly above 60° F., and I prefer to carry out the initial reaction at a temperature of 80 to 150° F. at atmospheric pressure. Temperature used should be low enough to prevent the loss of low boiling phosphorus trichloride (B.P. 169° F. at 760 mm.) with the evolved hydrogen chloride. Pressures above atmospheric pressure are not particularly suitable, since the hydrogen chloride formed should be removed to foster the reaction. After an initial reaction period of one to two hours, using a nitrogen atmosphere or reflux conditions, reduced pressure and/or nitrogen stripping can be used to remove the evolved hydrogen chloride and complete the reaction. The use of a solvent or diluent other than the dimercaptan will not be required. The mercapto-substituted thio-phosphites can be recovered from the reaction mixtures by any suitable method. The particular recovery method used will depend upon the particular dimercaptan reacted with the phosphorus trichloride, and the desired use of the phosphite product. For some purposes, e.g., where polysulfide polymers are to be prepared from the phosphite, the excess dimercaptan (unreacted) need not be removed; but where it is desired to remove the dimercaptan, it may be stripped off at reduced pressure to obtain a highly pure mercapto-substituted thio-phosphite product. Also, where the phosphite is subsequently oxidized, for example with air, it will not always be necessary to remove the unreacted dimercaptan.

The mercapto-substituted thio-phosphite product of this invention can be used as an oxygen scavenger, that is, it can be used to take up oxygen from the atmosphere. For example, the phosphite can be incorporated into polysulfide polymers where it will take up the atmospheric oxygen entering the polymer and prevent the premature aging of the polymer.

Where a mercapto-substituted thio-phosphate product is desired, it can be obtained by the simple oxidation of the phosphite precursor. For example, the mercapto-substituted thio-phosphite can be blown with air at temperatures of 60 to 400° F., preferably 80 to 150° F., using at least 10 moles of oxygen per mole of phosphite to get at least 90 percent oxidation of the latter, as illustrated by the following equation:

$$2(HSRS)_3P + O_2 \rightarrow 2(HSRS)_3P=O \quad (2)$$

The phosphites can also be oxidized with sulfur, for example at temperatures of 250 to 450° F., preferably 280 to 310° F. and in the absence of catalytic systems such as those used in polysulfide formation, to prepare the corresponding mercapto-substituted tetrathio-phosphate, as illustrated by the equation:

$$(HSRS)_3P + S \rightarrow (HSRS)_3P=S \quad (3)$$

The mercapto-substituted thio-phosphites and phosphates of this invention can also be used as cross-linking agents in the preparation of branched chain polysulfide polymers, where the degree of branching within the polysulfide polymer is limited by the molar quantity of mercapto-substituted thio-phosphite or phosphate incorporated within the polymer. As a preferred embodiment of this aspect of the invention, these phosphites and phosphates are employed in the reaction of dimercaptans with sulfur, as illustrated by the following simplified equation:

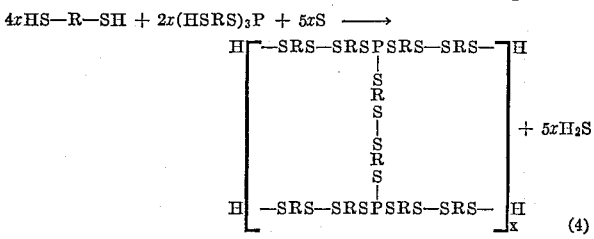

(4)

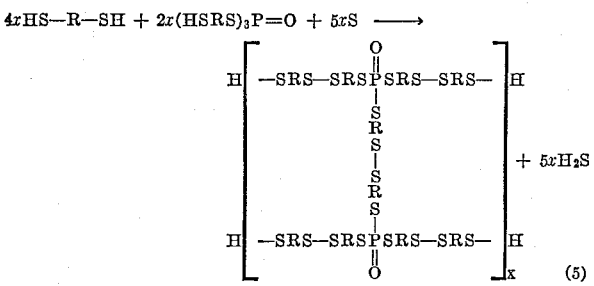

(5)

Instead of elemental sulfur, sulfur-donor or sulfur-yielding compounds can be used in preparing the polysulfide polymers, and the term "sulfur" as used herein means of these unless qualified. The amount of sulfur which can be used in preparing the polysulfides can vary appreciably but will be usually about 2 to 5 moles of sulfur per mole of dimercaptan, excess sulfur being preferred. The reaction between the dimercaptan, tri(mercaptoalkylthio)phosphite or phosphate, and sulfur will usually be carried out at temperatures in the range of 80 to 150° F. The particular temperatures used will depend upon the particular dimercaptan employed and the product desired, but generally temperatures in the range of 0 to 500° F., preferably in the range of 80 to 150° will be satisfactory. If the temperature is above 250° F., the phosphite product cannot be obtained as the sulfur will oxidize the phosphite to the phosphate. The pressure at which the polysulfide polymer formation is carried out will usually depend upon the dimercaptan used, but generally will be sufficient to maintain the reactants in a liquid phase. Usually pressures in the range of 0 to 100 p.s.i.g., preferably 0 to 15 p.s.i.g. will be sufficient. When superatmospheric pressures are required, an agent such as ZnO may be used to react with and remove the hydrogen sulfide gas generated by the aforementioned reaction. The reaction time will vary appreciably but ordinarily will be from about 0.25 to 10 hours, preferably about 1 to 2 hours.

The above described formation of the polysulfide polymers using sulfur is preferably carried out in the presence of a catalyst, particularly those compounds having an alkaline reaction such as alkali metal, oxides, hydroxides, and sulfides, ammonia, amines, etc. The amines are preferred because of their solubility in the reaction mixtures. Representative examples of suitable amines that can be employed include mono-, di- and trialkyl amines having up to about 6 carbon atoms in each alkyl group, such as monoethanolamine, diethanolamine, triethanolamine, di-n-butyl amine, tri-n-butyl amine, dibenzyl amine, tetramethylene-penta-amine, the guanidines such as diphenyl guanidine and the like. Another group of catalysts that can be employed include the alkali metal sulfides, especially sodium and potassium sulfides. These latter materials are preferably employed in the presence of a small amount of an alcohol such as methanol.

The amount of catalyst employed for preparing said polysulfide polymers can vary appreciably but will generally be in the range 0.5 to 5 weight percent of the reaction mixture, preferably from about 1 to about 2 weight percent of the reaction mixture.

In place of using sulfur in the formation of the polysulfide polymers, I can use any catalyst or system capable of joining two mercapto groups, such as di- or poly-valent metallic salt, oxide, or hydroxide, e.g., zinc hydroxide, or a dicarboxylic acid HOOC—R—COOH or a diacetyl halide XC(O)—R—C(O)X where R is an organo radical as defined above and X is a halo radical such as chlorine, bromine, and iodine, or air in the presence of cupric chloride and hydrochloric acid.

The process for preparing the polysulfide polymers of this invention is preferably carried out in the absence of a diluent. However, diluents suitable for use in the process are hydrocarbons which are not detrimental to the oxidation reaction. Suitable diluents include aromatics such as benzene, toluene, xylene, ethylbenzene and mixtures thereof. It is also within the scope of the invention to use straight and branched chain paraffins which contain up to and including 10 carbon atoms per molecule. Examples of pariffins which can be utilized include propane, n-butane, n-pentane, isopentane, n-hexane, isohexane, 2,2,4-tri-methylpentane (isooctane), n-decane and the like. Mixtures of these paraffinic hydrocarbons can also be employed as diluents in carrying out the process of this invention. Cycloparaffins such as cyclohexane and methylcyclohexane can also be used. Also mixtures of any of the aforementioned hydrocarbons can be used as the diluent. The amount of diluent employed will vary appreciably and can range as high as 90 to 95 percent of the reaction mixture.

These polysulfide polymers are generally rubbery in nature and can be used as calking compounds, fuel sealing putty, oil resistant rubber, binders for solid rocket propellants and the like.

The objects and advantages of this invention are further illustrated in the following examples, but it should be understood that the various materials used, reaction temperatures, pressures, amounts, and other details in these examples are not to be construed so as to unduly limit this invention.

EXAMPLE I

Phosphorus trichloride, in the amount of 0.611 mole, was added slowly over a period of 45 min. to 5.50 moles of the dimercaptan of vinylcyclohexane (2-mercaptoethyl-4-cyclohexanethiol) contained in a stirred glass reactor equipped with a reflux condensor (temperature controlled between 100 and 115° F.). After the phosphorus trichloride was completely added, the reactants were heated to 140–160° F. for 45 min. The reaction mixture was then charged to a flash unit and the pressure reduced from atmospheric to 5 mm. over a 1-hr. period, during which the temperature was controlled between 140 and 160° F. Completion of the reaction was indicated when no further hydrogen chloride gas was evolved at the end of the pressure reduction period. The pressure on the reaction mixture was then reduced at 1–2 mm. and the dimercaptan was flashed off at 200 to 300°

F. The resulting mercapto-substituted thio-phosphite was recovered as a kettle product and it amounted to 0.614 mole, representing a yield of 99+ mole percent, based on the phosphorus trichloride. The amount of unreacted dimercaptan was 3.57 moles. The characterization of the mercapto-substituted thio-phosphite product ($C_{24}H_{45}S_6P$) is set forth in Table I.

*Table I*

|  | Found | Theoretical |
|---|---|---|
| Molecular weight | 553 | 557 |
| Total sulfur, wt. percent | 31.4 | 34.5 |
| Mercaptan sulfur, wt. percent | 15.85 | 17.2 |
| Total phosphorus, wt. percent | 5.89 | 5.57 |

EXAMPLE II

Seventy-five gm. of the mercapto-substituted thio-phosphite prepared according to Example I was mixed with 150 gm. of the dimercaptan of vinylcyclohexane (as a diluent) and the mixture was charged to a 500 ml. glass stirred reactor equipped for air bubbling and venting to the atmosphere. Air was bubbled through the stirred reaction mixture overnight at ambient temperatures (about 16 hrs. at 75–90° F.). The amount of oxygen passed through the reaction mixture was between 30–40 moles per mole of the mercapto-substituted thio-phosphite. The reaction mixture was then charged to a flash unit (a short-path vacuum distillation still) and the dimercaptan diluent was removed at 300° F. and 1 mm. pressure. The mercapto-substituted thio-phosphate was recovered as a kettle product and it amounted to 0.17 mole, which represents a 99+ mole percent yield based on the mercapto-substituted thio-phosphite charged. The mercapto-substituted thio-phosphate product ($C_{24}H_{45}S_6PO$) characterization is set forth in Table II.

*Table II*

|  | Found | Theoretical |
|---|---|---|
| Molecular weight | 572 | 573 |
| Total sulfur, wt. percent | 31.2 | 33.5 |
| Mercaptan sulfur, wt. percent | 15.70 | 16.75 |
| Total phosphorus, wt. percent |  | 5.42 |

EXAMPLE III

In this example, 0.413 mole of phosphorus trichloride was reacted with 2.50 moles of the dimercaptan of dipentene (2,9-p-menthanedithiol), using the reaction and recovery procedures of Example I. The mercapto-substituted thio-phosphite product recovered in this example was 0.413 mole, which represents a yield of 99+ mole percent, based on the phosphorus trichloride charged. The unreacted dimercaptan amounted to 1.08 moles. The characterization of the mercapto-substituted thio-phosphite product ($C_{30}H_{57}S_6P$) of this example is set forth in Table III.

*Table III*

|  | Found | Theoretical |
|---|---|---|
| Molecular weight | 641 | 638 |
| Total sulfur, wt. percent | 30.4 | 30.2 |
| Mercaptan sulfur, wt. percent | 15.01 | 15.08 |
| Total phosphorus, wt. percent | 4.79 | 4.86 |

EXAMPLE IV

In this example, 0.413 mole of phosphorus trichloride was added slowly to 2.50 moles of the dimercaptan using the reactor and reaction procedure of Example I. At the completion of the reaction, air was bubbled through the stirred reaction mixture and the oxidation and recovery procedures were carried out according to Example II. The amount of unreacted dimercaptan recovered was 1.07 moles, and the amount of mercapto-substituted thio-phosphate recovered was 0.412 mole which represents a yield of 99+ mole percent based on the phosphorus trichloride charged. The characterization of the mercapto-substituted thiophosphate product ($C_{30}H_{57}S_6PO$) is set forth in Table IV.

*Table IV*

|  | Found | Theoretical |
|---|---|---|
| Molecular weight | 667 | 654 |
| Total sulfur, wt. percent | 29.5 | 29.4 |
| Mercaptan sulfur, wt. percent | 14.87 | 14.71 |
| Total phosphorus, wt. percent | 4.58 | 4.74 |

EXAMPLE V

In this example, a high molecular weight polysulfide polymer was prepared by reacting the mercapto-substituted thio-phosphite of Example III with the dimercaptan of dipentene, in the presence of zinc oxide, sulfur, and monoethanolamine. For purposes of comparison, a polysulfide polymer was prepared using the same procedure except in the absence of the mercapto-substituted thio-phosphite. The charged recipes (in parts by weight) for these runs are set forth in Table V.

*Table V*

|  | Parts by weight | |
|---|---|---|
|  | Run A | Run B |
| Dimercaptan of dipentene | 65 | 40 |
| Mercapto-substituted thio-phosphite | 0 | 25 |
| Zinc oxide | 15 | 15 |
| Sulfur | 15 | 15 |
| Monoethanolamine | 5 | 5 |

The product prepared according to Run B was more rigid and rubbery than that prepared according to Run A.

Various modifications and alterations of this invention will become apparent to those skilled in the art from the foregoing description and examples, and this invention should not be limited unduly to that set forth herein for illustrative purposes.

I claim:

1. A method for preparing a polysulfide polymer, which comprises reacting a dimercaptan with a mercapto-substituted thio-phosphite, having the structure $(HSRS)_3P$ wherein R is an organo radical having 1 to 20 carbon atoms per molecule, said mercapto-substituted thio-phosphite having been prepared by reacting a dimercaptan with phosphorus trichloride.

2. A method for preparing a polysulfide polymer, which comprises reacting a dimercaptan of the general formula HS—R—SH, where R is a radical, having 1 to 20 carbon atoms and being selected from the group consisting of aliphatic, cycloaliphatic, and aromatic, and combinations thereof, with a mercapto-substituted thio-phosphite, having the structure $(HSRS)_3P$ wherein R is as defined hereinabove prepared by reaction of at least three moles of said dimercaptan with 1 mole of phosphorus trichloride.

3. The method according to claim 2, wherein said polysulfide polymer formation is carried out in the presence of sulfur.

4. The method according to claim 2, wherein said dimercaptan is 2-mercaptoethyl-4-cyclohexanethiol.

5. The method according to claim 2, wherein said dimercaptan is 2,9-p-menthanedithiol.

6. A polysulfide polymer prepared according to the method of claim 2.

7. A polysulfide polymer prepared according to the method of claim 3.

8. A method for preparing a polysulfide polymer, which comprises reacting a dimercaptan with a mercapto-substituted thio-phosphate, having the structure $$(HSRS)_3P=O$$

prepared by oxidizing a mercapto-substituted thio-phosphite having the structure $(HSRS)_3P$ prepared by reacting a dimercaptan with phosphorus trichloride.

9. The method according to claim 8, wherein said dimercaptan is 2-mercaptoethyl-4-cyclohexanethiol.

10. The method according to claim 8, wherein said dimercaptan is 2,9-p-menthanedithiol.

11. A polysulfide polymer prepared according to the method of claim 8.

References Cited by the Examiner
UNITED STATES PATENTS

| | | | |
|---|---|---|---|
| 2,940,959 | 6/1960 | Rosenthal et al. | 260—79.1 |
| 2,964,503 | 12/1960 | Carpenter et al. | 260—79.1 |
| 3,136,807 | 6/1964 | Warner et al. | 260—461.112 |
| 3,174,989 | 3/1965 | Warner et al. | 260—461.112 |

LEON J. BERCOVITZ, *Primary Examiner.*

M. I. MARQUIS, *Assistant Examiner.*